United States Patent
Nakamura et al.

(10) Patent No.: US 6,743,517 B2
(45) Date of Patent: Jun. 1, 2004

(54) PROCESS FOR PRODUCING OPTICAL ELEMENT

(75) Inventors: Koichiro Nakamura, Osaka (JP); Hiroko Shikata, Osaka (JP); Hiroaki Yamamoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/250,370

(22) PCT Filed: Oct. 21, 2002

(86) PCT No.: PCT/JP02/10885
§ 371 (c)(1),
(2), (4) Date: Jul. 1, 2003

(87) PCT Pub. No.: WO03/035788
PCT Pub. Date: May 1, 2003

(65) Prior Publication Data
US 2004/0048076 A1 Mar. 11, 2004

(30) Foreign Application Priority Data
Oct. 23, 2002 (JP) ........................................ 2001-325207

(51) Int. Cl.⁷ ............................................... C08G 77/18
(52) U.S. Cl. ........................ 428/447; 156/329; 156/99; 528/39; 528/43
(58) Field of Search ................. 156/32, 99; 428/447; 528/39, 43; 106/287.14

(56) References Cited

U.S. PATENT DOCUMENTS 2,383,827 A * 8/1945 Sprung ........................ 528/15
2,389,477 A * 11/1945 Wright et al. ................. 528/15
4,374,696 A   2/1983 Schmidt et al.
5,991,493 A   11/1999 Dawes et al.
6,415,093 B1 * 7/2002 Nakamura et al. .......... 385/141

FOREIGN PATENT DOCUMENTS

| JP | 62-297369 | 12/1987 |
| JP | 4-97927 | 3/1992 |
| JP | 2000-235108 | 8/2000 |
| JP | 2002-189420 | 7/2002 |
| WO | 02/14451 | 2/2002 |

\* cited by examiner

*Primary Examiner*—Margaret G. Moore
(74) *Attorney, Agent, or Firm*—Wenderoth, Lind & Ponack, L.L.P.

(57) ABSTRACT

An optical device assembled by means of an adhesive composition which is free from the cracking of an adhesive layer thereof, is prepared easily and has excellent adhesive strength.

The optical device is produced by placing an adhesive composition prepared by hydrolyzing, dehydrating and condensing a starting solution which contains 10 to 50 mol % of a silane compound represented by $SiX^1_4$ ($X^1$ is a hydrolyzable group) or a combination of the silane compound and a metal alkoxide, 25 to 65 mol % of a silane compound represented by $PhSiX^2_3$ (Ph is a phenyl group or substituted phenyl group, and $X^2$ is a hydrolyzable group), and 25 to 65 mol % of a silane compound represented by $(CH_3)_2SiX^3_2$ ($X^3$ is a hydrolyzable group) between an optical part and another part and heating it to bond the optical part to the another part.

5 Claims, No Drawings

PROCESS FOR PRODUCING OPTICAL ELEMENT

FIELD OF THE INVENTION

The present invention relates to a process for producing an optical device, more specifically, a process for producing an optical device by bonding an optical part to another part by means of an adhesive, an optical device produced by bonding parts, and an adhesive composition.

DESCRIPTION OF THE PRIOR ART

The following adhesive compositions for optical parts which comprise a metal alkoxide are known: (i) JP-A 62-297369 discloses that an optical device is bonded by means of an adhesive comprising a hydrolyzate of a silicon alkoxide, (ii) U.S. Pat. No. 4,374,696 teaches that glass is bonded by means of a sol-gel organic-inorganic adhesive which contains dichloromethylvinylsilane, dichlorodiphenylsilane, aminopropyltriethoxysilane and tetraalkoxysilane, and (iii) U.S. Pat. No. 5,991,493 discloses that an optical part is bonded by means of an organic-inorganic composite adhesive obtained by hydrolyzing a sol which comprises polydimethylsiloxane, methyltriethoxysilane and phenyltrifluorosilane.

However, the above prior art technologies involve the following problems. The above method (i) has a problem that when the thickness of an adhesive layer becomes 1 μm or more, the adhesive layer cracks and sufficient adhesive force cannot be obtained as the metal alkoxide used is tetraethoxysilane. In the methods (ii) and (iii), an adhesive layer having a thickness of 1 μm or more is obtained but the separation of the layer of a solution composition readily occurs and the work of preparing an adhesive composition is troublesome.

SUMMARY OF THE INVENTION

It is an object of the present invention to provide an optical device assembled by means of an adhesive composition which is free from the cracking of an adhesive layer thereof, is easily prepared and has excellent adhesive strength, and a process for producing the optical device.

Other objects and advantages of the present invention will become apparent from the following description.

According to the present invention, firstly, the above objects and advantages of the present invention are attained by a process for producing an optical device, comprising the steps of:

placing an adhesive composition prepared by hydrolyzing, dehydrating and condensing a starting solution containing:

(A) 10 to 50 mol % of a silane compound represented by the following formula (1):

$$SiX^1_4 \qquad (1)$$

wherein $X^1$ is a hydrolyzable group, or a combination of this silane compound and a metal alkoxide represented by the following formula (7):

$$M(OR^4)_n \qquad (7)$$

wherein M is Ti, Al or Zr, $R^4$ is an alkyl group or trialkoxysilyl group, and n is 4 when M is Ti or Zr and n is 3 when M is Al, with the proviso that only one of the three $R^4$'s can be a trialkoxysilyl group when M is Al, the amount of the metal alkoxide being 50 mol % or less based on 100 mol % of the total of the metal alkoxide and the silane compound represented by the above formula (1), (B) 25 to 65 mol % of a silane compound represented by the following formula (2):

$$PhSiX^2_3 \qquad (2)$$

wherein Ph is a phenyl group or substituted phenyl group, and $X^2$ is a hydrolyzable group, and (C) 25 to 65 mol % of a silane compound represented by the following formula (3):

$$(CH_3)_2SiX^3_2 \qquad (3)$$

wherein $X^3$ is a hydrolyzable group, between an optical part and another part; and heating it to bond the optical part to the another part.

According to the present invention, secondly, the above objects and advantages of the present invention are attained by an optical device assembled by bonding an optical part to another part by means of an adhesive layer containing:

(1) 10 to 50 mol % of silica represented by the following formula (4):

$$SiO_2 \qquad (4)$$

or a combination of the silica and at least one metal oxide selected from the group consisting of $TiO_2$, $Al_2O_3$, $ZrO_2$ and composite oxide thereof, (2) 25 to 65 mol % of phenylsiloxane or substituted phenylsiloxane represented by the following formula (5):

$$PhSiO_{3/2} \qquad (5)$$

wherein Ph is a phenyl group or substituted phenyl group, and (3) 25 to 65 mol % of dimethylsiloxane represented by the following formula (6):

$$(CH_3)_2SiO_{2/2} \qquad (6).$$

The adhesive composition of the present invention contains unreacted (unhydrolyzed) and hydrolyzed/condensed forms of the silane compound represented by the formula (1) or a combination of the above forms of the silane compound represented by the formula (1) and a metal alkoxide represented by the formula (7) (to be referred to as "component (A)" hereinafter), unreacted and hydrolyzed/condensed forms of the silane compound represented by the formula (2) (to be referred to as "component (B)" hereinafter) and unreacted and hydrolyzed/condensed forms of the silane compound represented by the formula (3) (to be referred to as "component (C)" hereinafter). The silane compound as the component (A) is a raw material component which provides a silica component through hydrolytic and polycondensation reactions and contributes to the improvement of the heat resistance, chemical resistance and mechanical strength of the adhesive layer and the control of the linear expansion coefficient of the adhesive layer. Preferred examples of the hydrolyzable group $X^1$ in the formula (1) include alkoxyl group, acetoxyl group and halogen atom. As the component (A) is preferably used a tetraalkoxysilane or tetrahalogenated silane for example. The tetraalkoxysilane is preferably tetramethoxysilane, tetraethoxysilane, tetrapropoxysilane, tetrabutoxysilane or oligomer thereof for example. Out of these, tetramethoxysilane and tetraethoxysilane are preferably used because they are easily acquired.

The metal alkoxide represented by the above formula (7) of the component (A) forms a composite metal oxide with silica to contribute to the improvement of the chemical durability and mechanical durability of a bonded portion. It also provides a cutoff effect (a passivation effect) for ions and an alkali component which elute from an optical part as an adherend to the outside and contributes to the improvement of the humidity resistance of the bonded optical part. By controlling the amount of the metal alkoxide, the refractive index of the adhesive layer is increased to a value close to the refractive index values of two optical devices to be bonded together and a light transmission loss between the two optical devices can be made small. Further, the metal alkoxide functions as a catalyst for hydrolytic and dehydration/condensation reactions among the silane compound of the component (A), the component (B) and the component (C) and provides the effect of promoting these reactions at a low temperature. Therefore, when the metal alkoxide is used, an acid catalyst or basic catalyst which will be described hereinafter is not necessary. Examples of the alkyl group $R^4$ in the formula (7) include methyl group, ethyl group, propyl group and butyl group. Examples of the metal alkoxide (titanium alkoxide) when M in the formula (7) is Ti (titanium) include titanium tetraisopropoxide, titanium tetranormalbutoxide and chelate compounds thereof. Examples of the metal alkoxide (aluminum alkoxide) when M in the formula (7) is Al (aluminum) include aluminum-tri-sec-butoxide. Examples of the metal alkoxide (zirconium alkoxide) when M in the formula (7) is Zr (zirconium) include zirconium tetraisopropoxide and zirconium tetrabutoxide. They may be used directly or in the form of a chelate compound or hydrolyzate. Examples of the aluminum compound in which $R^4$ in the formula (7) is a trialkoxysilyl group include di-sec-butoxyaluminoxytriethoxysilane. It may be an oligomer. When the content of the metal alkoxide component in the adhesive composition is too low, the above effect is not obtained and when the content is too high, it is difficult to increase the thickness of the obtained film, and the film becomes brittle. Therefore, the amount of the metal alkoxide is preferably 5 to 50 mol % based on 100 mol % of the component (A).

When the amount of the component (A) is too small, its effect of contributing to the improvement of heat resistance, chemical resistance and mechanical strength and to the reduction of linear expansion coefficient becomes small. When the amount is too large and the thickness of the adhesive layer is 1 μm or more, the layer tends to crack. The amount of the component (A) is preferably 10 to 50 mol % based on 100 mol % of the total of the components (A), (B) and (C) before hydrolysis and condensation.

The components (B) and (C) are components which provide flexibility to the obtained film and prevent the adhesive layer from cracking even when the thickness of the layer is 1 μm or more. The substituted phenyl group represented by Ph in the formula (2) is a phenyl group substituted by 1 to 5 same or different substituents selected from the group consisting of an alkyl group having 1 to 3 carbon atom, F, Cl, Br, $CF_3$, $NO_2$ and CN, such as methylphenyl group, ethylphenyl group, dimethylphenyl group or trimethyphenyl group. The hydrolyzable groups $X^2$ and $X^3$ in the formulas (2) and (3) may be identical to the hydrolyzable group $X^1$ in the above formula (1).

Examples of the component (B) include phenyltrimethoxysilane, phenyltriethoxysilane, phenyltrichlorosilane and phenyltrifluorosilane. Out of these, phenyltriethoxysilane and phenyltrimethoxysilane are preferred because they are easily acquired.

Examples of the component (C) include dimethyldiethoxysilane, dimethyldimethoxysilane, dimethyldichlorosilane and dimethyldifluorosilane. Out of these, dimethyldiethoxysilane and dimethyldimethoxysilane are preferred because they are easily acquired.

When the total number of mols of the components (B) and (C) is too small, the effect of increasing the thickness of the adhesive layer becomes small and when it is too large, the effect of contributing to the improvement of mechanical strength and the reduction of linear expansion coefficient becomes small. The component (B) contributes to the improvement or rise of the heat resistance and refractive index of the film because it contains a phenyl group. When the amount of the component (B) is small, the refractive index becomes low and when the amount is large, the refractive index becomes high. The component (C) provides flexibility and has the effect of reducing refractive index. By adjusting the amounts of the components (B) and (C), the refractive index and flexibility of the film can be controlled. The amount of the component (B) is preferably 25 to 65 mol % and the amount of the component (C) is preferably 25 to 65 mol %, respectively, based on 100 mol % of the total of the components (A), (B) and (C) before hydrolysis and condensation.

In the present invention, when the degree of hydrolysis of the components (A), (B) and (C) in the composition is too low, sufficient adhesive strength may not be obtained, or the solution viscosity required for obtaining ease of operation is hardly obtained. When the degree of hydrolysis is too high, dehydration/condensation proceeds too far with the result that the molecular weight becomes too high, thereby making the adhesive layer too brittle or making it difficult to obtain sufficient strength. Therefore, the adhesive composition preferably contains unhydrolyzed forms of the components (A), (B) and (C) in amounts of 0.5 to 60%, 10 to 80%, 20 to 80% of the total amounts of the components (A), (B) and (C) in the above starting solution, respectively. The amounts of unhydrolyzed forms of the components (A), (B) and (C) can be controlled separately by hydrolyzing the components (A), (B) and (C) separately and then mixing them together.

A description is subsequently given of the process for preparing the adhesive composition of the present invention. A starting solution which contains the components (A), (B) and (C), water and optionally a hydrolyzing catalyst and solvent is stirred for 10 minutes to 5 hours and then heated at 40 to 80° C. for 30 minutes to 5 hours under reduced pressure or open system to carry out hydrolytic and dehydration/condensation reactions and distill off a volatile component, thereby obtaining an adhesive composition.

The hydrolyzing catalyst is an acid catalyst such as formic acid, acetic acid, propionic acid, butanoic acid, oxalic acid, hydrochloric acid, nitric acid or sulfuric acid, or a basic catalyst such as ammonia, sodium hydroxide or potassium hydroxide aqueous solution. Out of these, an acid catalyst in the form of an aqueous solution is preferably used. The amount of the acid catalyst differs according to the type of the acid and the strength of protonic acid (weak acid or strong acid). When the amount of the acid catalyst is too small, hydrolytic and dehydration/condensation reactions proceed slowly and when the amount is too large, a condensation reaction proceeds too far, whereby the molecular weight becomes too high, and a precipitate or the gelation of coating solution readily occurs disadvantageously. Therefore, the amount of the acid catalyst is preferably 0.01 to 10 mmol, more preferably 0.05 to 7 mmol based on 1 mol of the total of the components (A), (B) and (C) when formic acid is used as the acid catalyst. When a halogenated silane such as tetrachlorosilane is used as the component (A), when a halogenated silane such as trichlorosilane is used as the component (B) or when a halogenated silane such as methyldichlorosilane is used as the component (C), a reaction can take place without a catalyst and hydrochloric acid is formed in the reaction and serves as a catalyst for an alkoxysilane. Therefore, the addition of a hydrolyzing catalyst is not always necessary.

Water is preferably added more than the stoichiometric amount thereof required for hydrolysis. This is because when the amount of water is smaller than the above stoichiometric amount, an unreacted (unhydrolyzed) alkoxysilane or halogenated silane remains at the time of a heat treatment for gelation. In general, the amount of water is 0.8 to 30 times the required stoichiometric molar amount thereof, that is, preferably 0.8 to 10 times, more preferably 2 to 8 times the total molar amount of the components (A), (B) and (C). However, since water is often contained in an alcohol solvent as an impurity, or water is contained in a catalyst aqueous solution, water does not need to be always added.

The solvent is not an essential component but optionally used to adjust the viscosity of the adhesive composition for coating. When an alkoxysilane is used as the component (A), (B) or (C), an alcohol formed by the reaction of the alkoxysilane may be used as the solvent for adjusting the viscosity. Examples of the solvent include methanol, ethanol, isopropanol, butanol, isobutanol, hexanol, 2-ethoxyethanol, 2-methoxymethanol and diacetaldehyde. Out of these, an alcohol such as a lower alcohol having 1 to 4 carbon atoms is preferred, and methanol and ethanol having a low boiling point are particularly preferred. The reason for this is that the alcohol solvent can be removed from the solution swiftly by a heat treatment at a relatively low temperature after hydrolysis. When the solvent is used, the amount thereof is preferably 0.05 to 2 times the total number of mols of the components (A), (B), and (C).

To provide a homogenous micronetwork structure to the adhesive layer, a starting solution containing the components (A), (B) and (C) in the form of monomers is preferably used to carry out hydrolytic and condensation reactions. For example, tetraethoxysilane which is a monomer as the component (A), phenyltriethoxysilane which is a monomer as the component (B) and dimethyldiethoxysilane which is a monomer as the component (C) are preferably used.

After hydrolysis, it is desired to reduce the total content of the solvent and water in the adhesive composition as much as possible to preferably 1.0 wt % or less, more preferably 0.01 wt % or less by heating at 40 to 80° C. for 30 minutes to 5 hours under reduced pressure or normal pressure to distill off the solvent and water so as to carry out a condensation reaction. Thus, shrinkage and the generation of a gas can be suppressed during the curing of the adhesive layer.

Examples of the optical part in the present invention include lenses, prisms, diffraction gratings, filters, holding members for these and ferrules made from quartz glass or oxide glass such as silicate glass. The lenses include refractive index gradient (GRIN) lenses, aspherical lenses, Fresnel lenses and lenticular lenses.

The process of the present invention is used to bond glass or non-glass lenses or optical fibers together, or one of these optical parts to another part such as a part for supporting the optical part or a ferrule. More specifically, the bonding process of the present invention can be used to bond glass optical fibers together or glass GRIN lenses together, a glass GRIN lens to a glass optical fiber, a glass optical fiber to a ceramic ferrule, a glass optical fiber to an inorganic oxide band pass filter, a glass optical fiber to a glass waveguide device, a glass optical fiber to a glass waveguide diffraction grating, a glass GRIN lens to a metallic or ceramic support holder, or a glass GRIN lens to a substrate having a V-shaped groove.

The part (substrate) for supporting an optical part such as a lens or optical fiber is made from glass, semiconductor, ceramic or polymer. Examples of the glass include quartz glass, float glass, low-expansion heat resistant glass and crystallized glass. Examples of the semiconductor include silicon, InP and GaAs. The substrate may have a groove or hole for fixing an optical part. Examples of the grooved substrate include a glass substrate having a V-shaped groove and a silicon substrate having a V-shaped groove formed by etching.

For bonding optical parts together or an optical part to another part, the adhesive composition is applied to the surfaces of parts to be bonded together and then the bonding surfaces are butted against each other, or the surfaces of parts to be bonded together are opposed to each other and then the adhesive composition is impregnated or filled into the gap between the parts. Thereafter, the adhesive composition is heated at 80 to 400° C. for 10 to 120 minutes to be cured in order to fix the parts. The components (A), (B) and (C) contained in the adhesive composition which are unhydrolyzed and are being hydrolyzed and dehydrated/polycondensed are converted into $SiO_2$, $PhSiO_{3/2}$ and $(CH_3)_2SiO_{2/2}$ by heating in the end, respectively. After the adhesive composition is applied to the surfaces of the parts to be bonded together, when the initial viscosity of the adhesive composition is relatively low, the pressure is reduced to eliminate air bubbles to the outside of the adhesive layer and when the viscosity of the adhesive composition is relatively high, the pressure is increased to prevent the formation of air bubbles during the proceeding of a curing reaction. This prevents air bubbles formed by a gas generated during curing from remaining in the adhesive layer, thereby making it possible to suppress a reduction in adhesive strength or a reduction in light transmission.

The adhesive layer between the optical part and the another part bonded together contains 10 to 50 mol % of silica represented by the following formula (4):

$$SiO_2 \qquad (4)$$

or a combination of silica and at least one metal oxide selected from the group consisting of $TiO_2$, $Al_2O_3$, $ZrO_2$ and composite oxide thereof, 25 to 65 mol % of phenylsiloxane or substituted phenylsiloxane represented by the following formula (5):

$$PhSiO_{3/2} \qquad (5)$$

wherein Ph is a phenyl group or substituted phenyl group, and 25 to 65 mol % of dimethylsiloxane represented by the following formula (6):

$$(CH_3)_2SiO_{2/2} \qquad (6).$$

This adhesive layer preferably contains 47 to 67 wt % of silica or a combination of silica and the above metal oxide, 20 to 46 wt % of a phenyl group or substituted phenyl group and 7 to 23 wt % of a methyl group.

Embodiments of the Invention

<Preparation of Adhesive Composition 1>

10 g of tetraethoxysilane (TEOS), 20 g of phenyltriethoxysilane (PhTES), 20 g of dimethyldiethoxysilane (DiMeDiES), 4 g of ethanol and 13 g of a 0.1 wt % aqueous solution of formic acid were placed in a 10 ml beaker to prepare a starting solution. The starting solution contained 18 mol % of TEOS, 31 mol % of PhTES and 51 mol % of DiMeDiES based on 100 mol % of the total of these. The beaker filled with the starting solution was covered with a wrapping film to be stirred. The starting solution was initially an emulsion but became a homogenous solution after 2 hours. When the amounts of unreacted silane compounds contained in the solution were determined by gas chromatography, the amount of the unreacted silane compound (A) was 0.4 wt %, the amount of the unreacted silane compound (B) was 8 wt % and the amount of the unreacted silane compound (C) was 15 wt %. After 4 hours of agitation at room temperature, the wrapping film was removed and the solution was left to stand at room temperature for 15 hours. 10 g of the solution was taken out and placed in an evaporator in a water bath heated at 60° C. to distill off a volatile component under reduced pressure for 2 hours and concentrated until the weight of the solution became 6.5 g. When the solution was cooled to room temperature, solid matter was precipitated and removed by filtration with a filter having an opening diameter of 1 μm, thereby obtaining an achromatic transparent adhesive composition 1. When the amounts of the residual unreacted silane compounds contained in the adhesive composition 1 were determined by gas chromatography, the amount of the residual unreacted silane compound (A) was 40% of the total amount of the silane compound (A) used as a raw material, the amount of the residual unreacted silane compound (B) was 50% of the total amount of the silane compound (B) used as a raw material, and the amount of the residual unreacted silane compound (C) was 45% of the total amount of the silane compound (C) used as a raw material. The total amount of the alcohol and water in the adhesive composition 1 was 0.3 wt % or less.

<Preparation of Adhesive Composition 2>

An adhesive composition 2 was obtained in the same manner as the adhesive composition 1 except that 20.8 g of TEOS, 18.0 g of PhTES and 11.1 g of DiMeDiES were used in place of 10 g of TEOS, 20 g of PhTES and 20 g of DiMeDiES. (molar ratio of TEOS:PhTES:DiMeDiES= 40:30:30, ratio of the residual unreacted monomers: TEOS: 45%, PhTES: 50%, DiMeDiES: 50%)

<Preparation of Adhesive Composition 3>

An adhesive composition 3 was obtained in the same manner as the adhesive composition 1 except that 7.5 g of TEOS, 31.8 g of PhTES and 10.7 g of DiMeDiES were used in place of 10 g of TEOS, 20 g of PhTES and 20 g of DiMeDiES. (molar ratio of TEOS:PhTES:DiMeDiES= 15:55:30, ratio of the residual unreacted monomers: TEOS: 40%, PhTES: 40%, DiMeDiES: 50%)

<Preparation of Adhesive Composition 4>

An adhesive composition 4 was obtained in the same manner as the adhesive composition 1 except that PhTES and DiMeDiES used for the preparation of the above adhesive composition 1 were not used and 7.5 g of TEOS alone was used.

<Preparation of Adhesive Composition 5>

An adhesive composition 5 was obtained in the same manner as the adhesive composition 1 except that TEOS used for the preparation of the above adhesive composition 1 was not used and 20 g of PhTES and 20 g of DiMeDiES were used.

<Preparation of Adhesive Composition 6>

An adhesive composition 6 was obtained in the same manner as the adhesive composition 1 except that DiMeDiES used for the preparation of the above adhesive composition 1 was not used and 10 g of TEOS and 20 g of PhTES were used.

<Preparation of Adhesive Composition 7>

An adhesive composition 7 was obtained in the same manner as the adhesive composition 1 except that PhTES used for the preparation of the above adhesive composition 1 was not used and 10 g of TEOS and 20 g of DiMeDiES were used.

<Preparation of Adhesive Composition 8>

An adhesive composition 8 was obtained in the same manner as the adhesive composition 1 except that 7.0 g of TEOS and 3.0 g of titanium tetraisopropoxide were used in place of 10 g of TEOS.

<Materials>

(Quartz Substrate Having a V-Shaped Groove)

A 5 mm-thick 50 mm×50 mm quartz substrate having a V-shaped groove with a width of about 3 mm and a depth of 1 mm (length of 50 mm) formed in the surface of quarts glass plate was prepared.

(Microlens)

A glass microlens (Selfoc Microlens SMC18 of Nippon Sheet Glass Co., Ltd., diameter: 1.8 mm, length: 4.43 mm (0.23 pitch, refractive index of center portion: 1.590, distribution coefficient g=0.326, one pitch ($=2\pi/g$)=19.27 mm) was prepared.

EXAMPLE 1

<Adhesion>

A quartz substrate having a V-shaped groove was placed on a hot plate heated at 150° C., and a few drops of the adhesive composition 2 were let fall on the center of the V-shaped groove. After about 10 minutes, a microlens was placed at the center of the V-shaped groove in such a manner that its side surface was opposed to the surface of the substrate, and the hot plate was heated at 250° C. and maintained at that temperature for 2 hours. When the substrate was cooled to room temperature, the microlens was fixed on the V-shaped groove by the cured adhesive layer (thickness of about 25 μm). When the substrate was left on the hot plate heated at 350° C. for 2 hours to observe the appearance of the adhesive layer, there was no change in the appearance of the adhesive layer. Even when the substrate was left at a high temperature and a high humidity (85° C., 85%) for 500 hours, there was no change in the appearance and adhesion of the adhesive layer.

10 mg of drops of each of the above adhesive compositions (1 to 3 and 8) was let fall on a first slide glass sheet (25 mm×50 mm×1.2 mm), and a second slide glass sheet was placed on the first slide glass sheet immediately to spread the adhesive composition to a size of 25 mm×25 mm and maintain it at a temperature of 250° C. for 2 hours. To evaluate the initial adhesive strength of this adhesive layer, the glass sheets on both sides of the adhesive layer were pulled in opposite directions at a rate of 50 cm/min by a tensile tester to measure the adhesive strength (shear strength) ($N/mm^2$) of the adhesive layer. As a durability test, the above assembly comprising the glass sheets and the adhesive layer was placed in a thermostatic chamber maintained at a temperature of 85° C. and a relative humidity of 85% for 500 hours (high-temperature high-humidity test) to measure its adhesive strength in the same manner as described above.

EXAMPLES 2, 3 AND 4

The procedure of Example 1 was repeated except that the adhesive composition 1 (Example 2), the adhesive composition 3 (Example 3) and the adhesive composition 8 (Example 4) were used in place of the adhesive composition 2 used in Example 1. The same results as in Example 1 were obtained.

The measurement results of adhesive strengths of Examples 1 to 4 are shown in Table 1. All Examples 1 to 4 had an initial adhesive strength of 3 N/mm² or more and an adhesive strength after a high-temperature high-humidity test of 3 N/mm² or more.

TABLE 1

| Example | Adhesive | Shear strength (N/mm²) | |
| | | Initial | After high-temperature high-humidity test |
| --- | --- | --- | --- |
| 1 | 2 | 5 | 4 |
| 2 | 1 | 3 | 3 |
| 3 | 3 | 4 | 4 |
| 4 | 8 | 5 | 4 |

Comparative Example 1

The procedure of Example 1 was repeated except that the adhesive composition 4 was used in place of the adhesive composition 2 used in Example 1. A few drops of the adhesive composition 4 were let fall on the V-shaped groove. After about 10 minutes, a microlens was placed on the V-shaped groove and the hot plate was heated at 250° C. and maintained at that temperature for 2 hours. When the adhesive composition 4 was cooled to room temperature, the entire adhesive layer cracked and the microlens was not fixed on the V-shaped groove.

Comparative Examples 2, 3 and 4

The procedure of Example 1 was repeated except that the adhesive composition 5 (Comparative Example 2), the adhesive composition 6 (Comparative Example 3) and the adhesive composition 7 (Comparative Example 4) were used in place of the adhesive composition 2. That is, a few drops of each of the adhesive compositions 5 to 7 were let fall on the V-shaped groove. After about 10 minutes, a microlens was placed on the V-shaped groove and the hot plate was heated at 250° C. and maintained at that temperature for 2 hours. When the adhesive composition was cooled to room temperature, the microlens was fixed on the V-shaped groove but the adhesive composition 5 had a large linear expansion coefficient, the adhesive composition 6 had low flexibility, and it was difficult to form a film having a thickness of 0.4 μm or more from the adhesive composition 4.

EFFECT OF THE INVENTION

As described above, according to the present invention, an optical device is obtained by bonding an optical part to another part by means of an adhesive composition which is free from the cracking of an adhesive layer thereof and has excellent air tightness and heat resistance as well as high adhesive strength at a high temperature and a high humidity.

What is claimed is:

1. A process for producing an optical device, comprising the steps of:

placing an adhesive composition prepared by hydrolyzing, dehydrating and condensing a starting solution containing:

(A) 10 to 50 mol % of a silane compound represented by the following formula (1):

$$SiX^1_4 \qquad (1)$$

wherein $X^1$ is a hydrolyzable group, or a combination of this silane compound and a metal alkoxide represented by the following formula (7):

$$M(OR^4)_n \qquad (7)$$

wherein M is Ti, Al or Zr, $R^4$ is an alkyl group or trialkoxysilyl group, and n is 4 when M is Ti or Zr and n is 3 when M is Al, with the proviso that only one of the three $R^4$'s can be a trialkoxysilyl group when M is Al, the amount of the metal alkoxide being 50 mol % or less based on 100 mol % of the total of the metal alkoxide and the silane compound represented by the above formula (1), (B) 25 to 65 mol % of a silane compound represented by the following formula (2):

$$PhSiX^2_3 \qquad (2)$$

wherein Ph is a phenyl group or substituted phenyl group, and $X^2$ is a hydrolyzable group, and (C) 25 to 65 mol % of a silane compound represented by the following formula (3):

$$(CH_3)_2SiX^3_2 \qquad (3)$$

wherein $X^3$ is a hydrolyzable group, between an optical part and another part; and heating it to bond the optical part to the another part.

2. The process of claim 1, wherein the adhesive composition comprises an unhydrolyzed form of the component (A) in an amount of 0.5 to 60% of the total amount of the component (A), an unhydrolyzed form of the component (B) in an amount of 10 to 80% of the total amount of the component (B) and an unhydrolyzed form of the component (C) in an amount of 20 to 80% of the total amount of the component (C).

3. An optical device assembled by bonding an optical part to another part by means of an adhesive layer containing:

(1) 10 to 50 mol % of silica represented by the following formula (4):

$$SiO_2 \qquad (4)$$

or a combination of the silica and at least one metal oxide selected from the group consisting of $TiO_2$, $Al_2O_3$, $ZrO_2$ and composite oxide thereof, (2) 25 to 65 mol % of phenylsiloxane or substituted phenylsiloxane represented by the following formula (5):

$$PhSiO_{3/2} \qquad (5)$$

wherein Ph is a phenyl group or substituted phenyl group, and (3) 25 to 65 mol % of dimethylsiloxane represented by the following formula (6):

$$(CH_3)_2SiO_{2/2} \qquad (6).$$

4. The optical device of claim 3 assembled by bonding an optical part to another part by means of an adhesive layer which contains 47 to 67 wt % of silica or a combination of silica and a metal oxide, 20 to 46 wt % of a phenyl group or substituted phenyl group and 7 to 23 wt % of a methyl group.

5. An adhesive composition which is prepared by hydrolyzing, dehydrating and condensing a starting solution containing 10 to 50 mol % of a tetraalkoxysilane, 25 to 65 mol % of a phenyltrialkoxysilane, 25 to 65 mol % of a dimethyldialkoxysilane, and 0 to 1,000 mols of water, 0.005 to 0.7 mol of an acid catalyst and 0.05 to 2 mols of an alcohol based on 100 mols of the total of the above silane compounds and which contains the residual unreacted tetraalkoxysilane in an amount of 0.5 to 60% of the total amount of the tetraalkoxysilane, the residual unreacted phenyltrialkoxysilane in an amount of 10 to 80% of the total amount of the phenyltrialkoxysilane and the residual unreacted dimethyldialkoxysilane in an amount of 20 to 80% of the total amount of the dimethyldialkoxysilane.

* * * * *